(12) United States Patent
Marchlewski et al.

(10) Patent No.: US 10,336,378 B2
(45) Date of Patent: Jul. 2, 2019

(54) ADJUSTABLE TAILGATE SYSTEM

(71) Applicant: FORD GLOBAL TECHNOLOGIES, LLC, Dearborn, MI (US)

(72) Inventors: Jack Marchlewski, Saline, MI (US); Dragan B. Stojkovic, Taylor, MI (US); Jeffrey Gray, Dearborn, MI (US); Joshua Robert Hemphill, White Lake, MI (US); Robert Reiners, Grosse Ille, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/610,924

(22) Filed: Jun. 1, 2017

(65) Prior Publication Data

US 2018/0346039 A1 Dec. 6, 2018

(51) Int. Cl.
*B62D 33/037* (2006.01)
*B62D 33/027* (2006.01)
*B62D 33/03* (2006.01)

(52) U.S. Cl.
CPC ....... *B62D 33/037* (2013.01); *B62D 33/0273* (2013.01); *B62D 33/03* (2013.01)

(58) Field of Classification Search
CPC ... B62D 33/037; B62D 33/03; B62D 33/0273
See application file for complete search history.

(56) References Cited

U.S. PATENT DOCUMENTS

| | | | |
|---|---|---|---|
| 5,169,202 | A | 12/1992 | Cupp |
| 5,556,151 | A | 9/1996 | New et al. |
| 6,169,202 | B1 | 1/2001 | Wijesekera et al. |
| 6,802,552 | B2 | 10/2004 | Hunt |
| 6,843,519 | B2 | 1/2005 | Ojanen |
| 6,991,277 | B1 | 1/2006 | Esler |
| 7,677,626 | B2 | 3/2010 | Hanzel |
| 7,812,295 | B2 | 10/2010 | Zalevsky et al. |
| 2004/0084925 | A1 | 5/2004 | Ojanen |
| 2008/0190977 | A1 | 8/2008 | Estabrook |
| 2015/0061319 | A1 | 3/2015 | Johnson et al. |
| 2016/0023691 | A1 | 1/2016 | Bales et al. |
| 2016/0236625 | A1 | 8/2016 | Kogut |

FOREIGN PATENT DOCUMENTS

| | | | | |
|---|---|---|---|---|
| AU | 731547 B2 | 4/2001 | | |
| WO | WO-2015143267 A1 | * | 9/2015 | ............ B60J 7/141 |

* cited by examiner

*Primary Examiner* — D Glenn Dayoan
*Assistant Examiner* — Melissa A Black
(74) *Attorney, Agent, or Firm* — Vichit Chea; Brooks Kushman P.C.

(57) ABSTRACT

A vehicle includes a bed and a tailgate. The bed has first and second side panels. The tailgate is rotatably secured to the bed along a horizontal axis and has a plurality of extruded sections that are arranged in a longitudinally extending chain. Each section extends laterally between the first and second side panels. Adjacent sections are secured to each other via hinges that rotate about axes that are substantially parallel to the horizontal axis.

20 Claims, 4 Drawing Sheets

ADJUSTABLE TAILGATE SYSTEM

TECHNICAL FIELD

The present disclosure relates to vehicles, such as trucks, that include cargo beds and tailgates that provide access to the cargo beds.

BACKGROUND

Pickup trucks include cargo beds that are configured to received and store cargo being transported. Tailgates may be included to provide access to the cargo beds.

SUMMARY

A vehicle includes a bed and a tailgate. The bed has first and second side panels. The tailgate is rotatably secured to the bed along a horizontal axis and has a plurality of extruded sections that are arranged in a longitudinally extending chain. Each section extends laterally between the first and second side panels. Adjacent sections are secured to each other via hinges that rotate about axes that are substantially parallel to the horizontal axis.

A vehicle includes a bed and a tailgate. The bed has first and second side panels that extend upward from a floor panel. The tailgate is rotatably secured to the bed proximate to the floor panel and has a plurality of sections arranged in a chain that extends from the floor panel to tops of the side panels when the tailgate is in an upward position. Adjacent sections are secured to each other via hinges that rotate about horizontal axes.

A truck includes a tailgate. The tailgate includes a plurality of laterally extending extruded sections that are arranged in a longitudinally extending chain and hinges that rotatably secure adjacent sections to each other along laterally extending axes.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
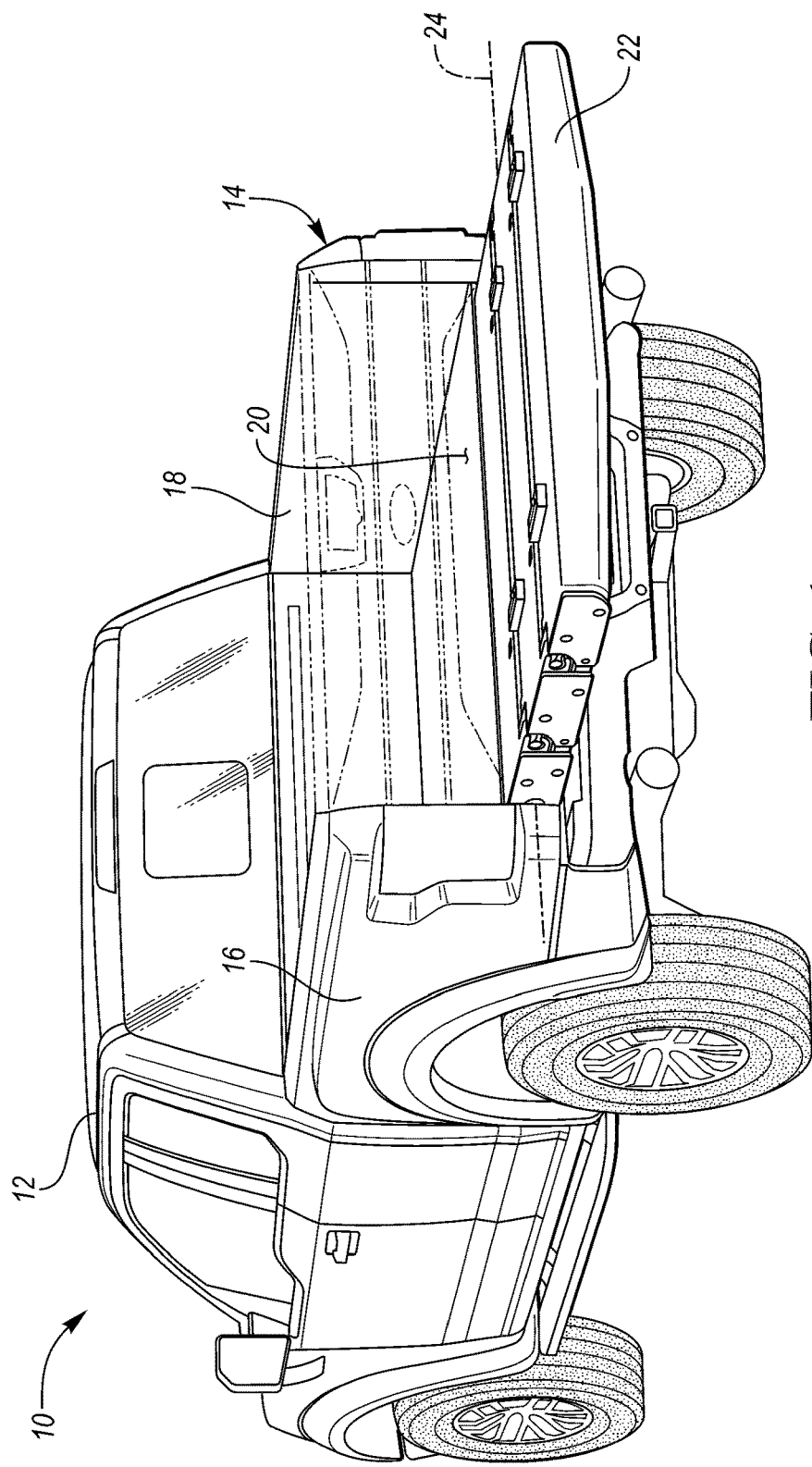
FIG. 1 is a perspective view of a vehicle, such as a truck, having a cargo or truck bed.

Referring to FIG. 1, a perspective view of vehicle 10 is illustrated. The illustrated vehicle 10 may be a truck. The vehicle 10 may include a body 12 (that includes a cabin space) and a cargo bed (or truck bed) 14. The body 12 and the cargo bed 14 may each be secured to a frame. The cargo bed 14 has a first side panel 16 and a second side panel 18 that extend upward from a floor panel 20. A tailgate 22 provides access to the cargo bed 14. The tailgate 22 may be rotatably secured to the cargo bed 14 proximate to the floor panel 20 such that the tailgate is rotatable relative to the cargo bed 14 along an axis 24, which may be a horizontal or a horizontally extending axis, that extends laterally between the first side panel 16 and second side panel 18. The tailgate 22 is shown to be in a downward and opened position in solid lines and in an upward and closed position in phantom lines. The body 12 and cargo bed 14 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
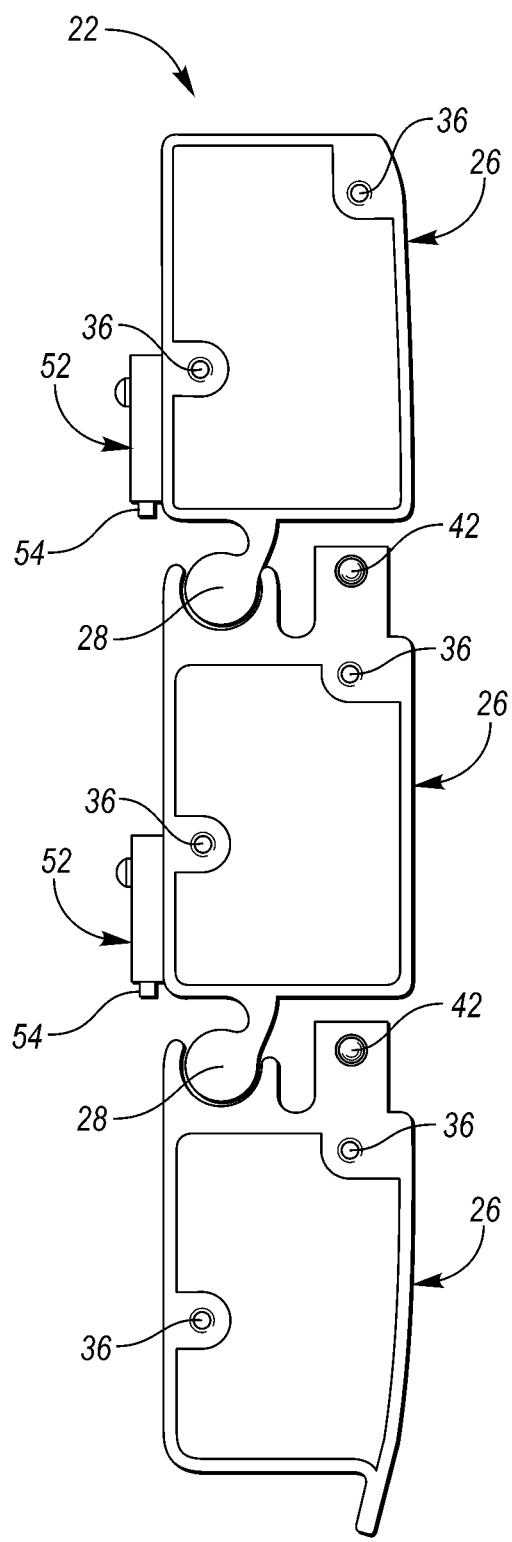
FIG. 2 is a side view of a tailgate that has a plurality of extruded sections and is oriented in a first position.
Figure 3:
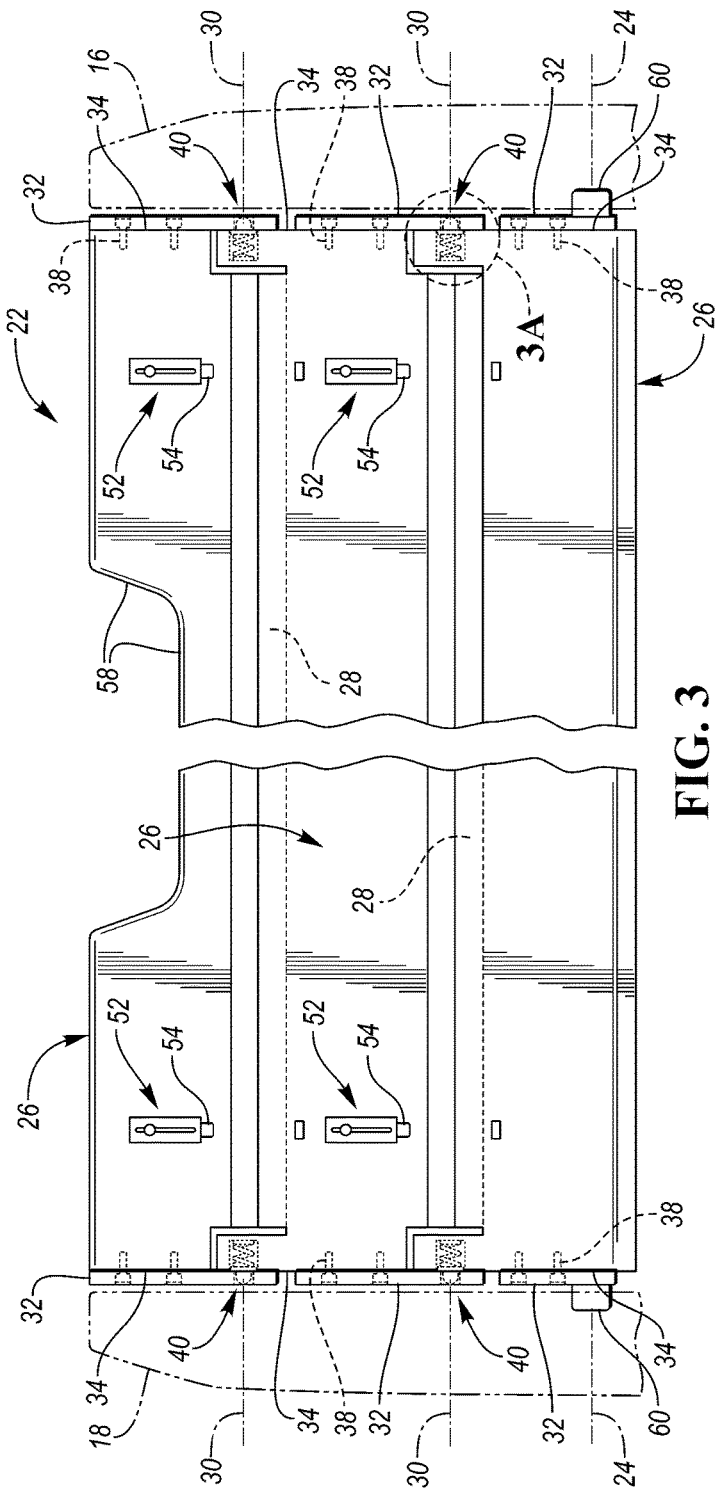
FIG. 3 is a front view of an internal side of the tailgate.

Referring to FIGS. 2 and 3, a side view of the tailgate 22 oriented in a first position and front view of an internal side of the tailgate 22 are illustrated, respectively. The tailgate 22 has a plurality of extruded sections 26. Each extruded section 26 extends laterally between the first side panel 16 and the second side panel 18. The plurality of extruded sections 26 are arranged in a longitudinally extending chain. The longitudinally extending chain extends from the floor panel 20 to tops of the first side panel 16 and second side panel 18 when the tailgate 22 is the upward and closed position.

Adjacent sections 26 of the plurality of extruded sections 26 are secured to each other via hinges 28 that rotate about axes 30 that laterally extend between the first side panel 16 and second side panel 18. The hinges 28 may be integral components of the plurality of extruded sections 26 that are formed during an extrusion process that forms the of the plurality of extruded sections 26. The axes 30 may be substantially parallel to the axis 24 about which the tailgate 22 may be rotated relative to the cargo bed 14. Substantially parallel may include an incremental value that ranges from −10° to +10° from exactly parallel. The axes 30 may be horizontal or horizontally extending axes. The adjacent sections 26 of the plurality of extruded sections 26 may be configured to rotate about the hinges 28 between longitudinally aligned positions to substantially perpendicular positions relative to each other. The longitudinally aligned positions may refer to positions where adjacent sections 26 are substantially parallel to each other. Substantially parallel may include an incremental value that ranges from −10° to +10° from exactly parallel and substantially perpendicular may include an incremental value that ranges from −10° to +10° from exactly perpendicular. The plurality of extruded sections 26 are shown to be in longitudinally aligned positions in FIGS. 2 and 3.

End caps 32 may be secured to lateral ends 34 of the plurality of extruded sections 26. The end caps 32 are shown in FIG. 3 but are not included in FIG. 2 for illustrative purposes. The lateral ends 34 of the plurality of extruded sections 26 may define tapped holes 36 and the end caps 32 may be secured to the lateral ends 34 of the plurality of extruded sections 26 by fasteners 38 that extend through the end caps 32 and engage the tapped holes 36. The fasteners 38 may be disposed within countersunk holes defined by the end caps 32 to ensure that there is no inference between the heads of the fasteners 38 and the first side panel 16 and/or the second side panel 18.

Figure 3A:
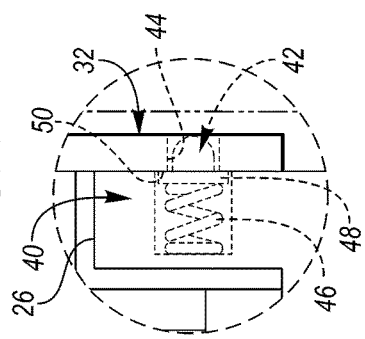
FIG. 3A is a magnified view of a latching mechanism.

A first set of latching mechanisms 40 may be configured to secure adjacent sections 26 of the plurality of extruded sections 26 in the longitudinally aligned positions. FIG. 3A illustrates a magnified view of one of the latching mechanisms 40. Each of the first set of latching mechanisms 40 includes a spring-loaded snap button 42 that is secured to one of a pair of adjacent sections 26 of the plurality of extruded sections 26. The snap button 42 may be configured to engage an orifice 44 defined by the end cap 32 that is secured to the other of the pair of adjacent sections 26 in order to secure the pair of adjacent sections 26 to each other in the longitudinally aligned position. The snap button 42 and a spring 46 that biases the snap button outward may be disposed within an orifice defined by the extruded sections 26 that the snap button 42 is secured to. The snap button 42 may include a lip or ridge 48 that engages an overhang 50 on the adjacent end cap 32 to prevent the snap button 42 from being forced completely out of the of the orifice defined by the extruded section 26. Alternatively, the overhang 50 may be part of the extruded section 26. The snap button 42 may be depressed such that the spring 46 is further compressed and the snap button 42 is displaced out of the orifice 44 defined by the end cap 32. When the snap button 42 is displaced out of the orifice 44 defined by the end cap 32, adjacent sections 26 of the plurality of extruded sections 26 may be adjusted between the longitudinally aligned position and the substantially perpendicular position relative to each other. Although the latching mechanisms 40 are shown to be spring-loaded snap buttons 42 that engage orifices 44, it should be understood that the latching mechanism may be any type of latching mechanism capable of securing adjacent sections 26 of the plurality of extruded sections 26 to each other in the longitudinally aligned positions. For example the latching mechanism may include a slide pin that is configured to engage an orifice.

A second set of latching mechanisms 52 may be configured to secure adjacent sections 26 of the plurality of extruded sections 26 in the substantially perpendicular positions relative to each other. Each of the second set of latching mechanisms 52 may include a slidable latching pin 54 that is secured to one of a pair of adjacent sections 26 of the plurality of extruded sections 26. Each slidable latching pin 54 may be configured to engage an orifice 56 defined by the other of the pair of adjacent sections 26 in order to secure the pair of adjacent sections 26 to each other in the substantially perpendicular position. The latching mechanisms 52 are shown to be secured to the internal surfaces of the plurality of extruded sections 26. However, the latching mechanism 52 may be disposed at any location on the plurality of extruded sections 26. For example, the latching mechanisms 52 may be disposed within central orifices defines by each of plurality of extruded sections 26. Although the latching mechanisms 52 are shown to be slidable latching pins 54 that engage orifices 56, it should be understood that the latching mechanisms 52 may be any type of latching mechanism capable of securing adjacent sections 26 of the plurality of extruded sections 26 to each other in the substantially perpendicular positions. For example the latching mechanism may include a snap button that is configured to engage an orifice The top section 26 of the plurality of extruded sections 26 may define a notch 58 that provides clearance for a trailer or fifth wheel connection. The end caps 32 that are secured to the bottom section 26 of the plurality of extruded sections 26 may include hinge pins 60 that rotatably secure the tailgate 22 to the bed 14.

Figure 4:
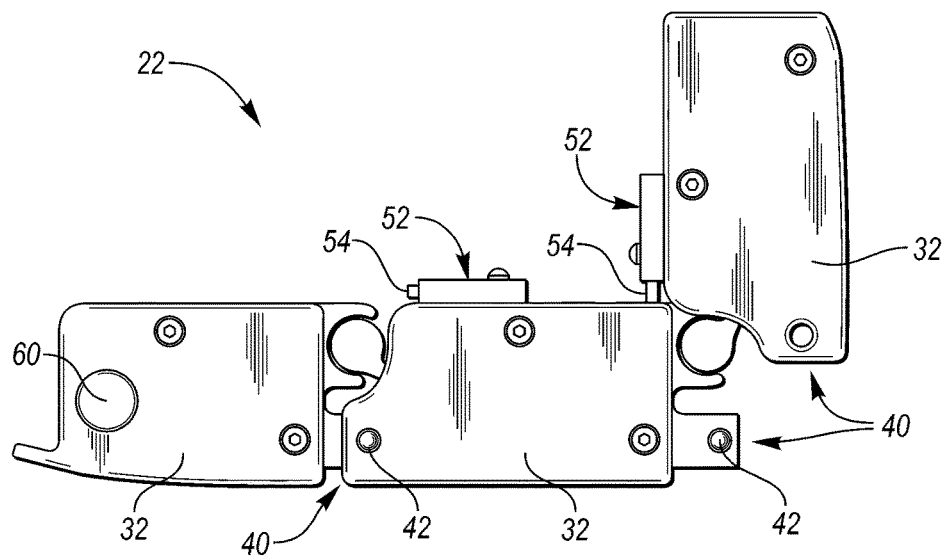
FIG. 4 is a side view of the tailgate oriented in a second position.

Referring to FIG. 4, a side view of the tailgate 22 oriented in a second position is illustrated. The tailgate 22 is shown to be in a down position. The bottom and middle sections 26 of the plurality of extruded sections 26 are shown to be in the longitudinally aligned position relative to each other. The bottom and middle sections 26 are adjacent to each other and are secured in the longitudinally aligned position relative to each other via the first latching mechanism 40. The middle and top sections 26 of the plurality of extruded sections 26 are shown to be in the substantially perpendicular position relative to each other. The middle and top sections 26 are adjacent to each other and are secured in the substantially perpendicular position relative to each other via the second latching mechanism 52. The multi-piece design of the tailgate 22 essentially functions to extend the bed 14 while maintaining a blocking feature configured to keep a long load from slipping or falling out the bed 14. Although the depicted embodiment shows a tailgate having three sections that are rotatably connected to each other, the disclosure should be construed to include tailgates having two or more sections that are rotatably connected to each where adjacent sections may be fixed in either longitudinally aligned or substantially perpendicular positions relative to each other.

Figure 5:
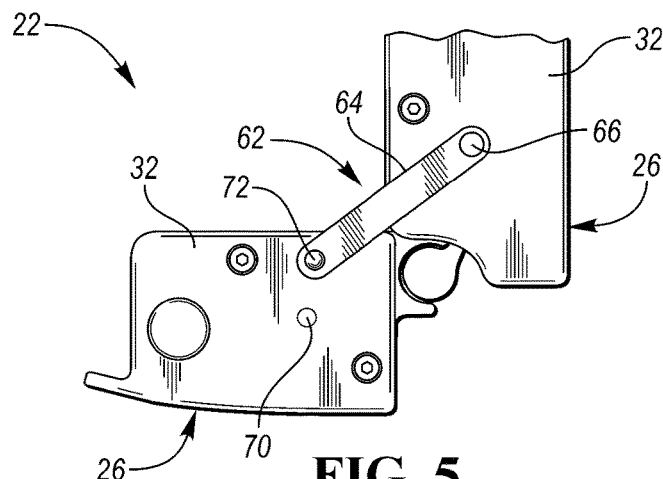
FIG. 5 is a side view of a portion of the tailgate including an alternative embodiment of a latching mechanism, where the alternative embodiment of the latching mechanism is securing adjacent sections of the plurality of extruded sections in a longitudinally aligned position.
Figure 6:
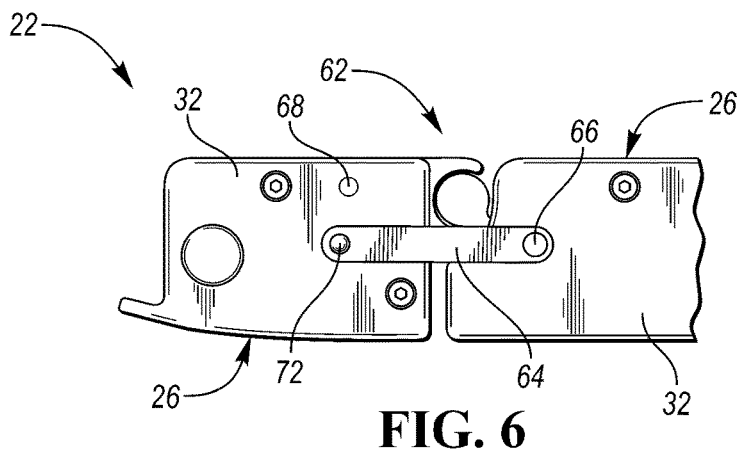
FIG. 6 is a side view of a portion of the tailgate including the alternative embodiment of a latching mechanism, where the alternative embodiment of the latching mechanism is securing adjacent sections of the plurality of extruded sections in a substantially perpendicular position.

Referring to FIGS. 5 and 6, a side view of a portion of the tailgate 22 including an alternative embodiment of a latching mechanism 62 is illustrated. FIG. 5 illustrates adjacent sections 26 of the plurality of extruded sections 26 in the longitudinally aligned position relative to each other, while FIG. 6 illustrates adjacent sections 26 of the plurality of extruded sections 26 in the substantially perpendicular position relative to each other. The alternative embodiment of the latching mechanism 62 may be configured to secure adjacent sections 26 of the plurality of extruded sections 26 in either the longitudinally aligned position or the substantially perpendicular position relative to each other.

The latching mechanism 62 may include a linking arm 64 that is rotatably secured to one of a pair of adjacent sections 26 of the plurality of extruded sections 26 by a pin 66. The other of the other of the pair of adjacent sections 26 may define a first orifice 68 and a second orifice 70. A snap button 72 may be secured to the linking arm 64 on an opposite end of the linking arm 64 relative to the pin 66. The snap button 72 may have the same features as the snap button 42 listed above. For example, the snap button 72 may be spring loaded and disposed within an orifice defined by the linking arm 64. The snap button may 72 also include a lip or ridge that engages an overhang on the linking arm 64 to prevent the snap button 72 from being forced completely out of the of the orifice defined by the linking arm 64. The snap button 72 may engage the first orifice 68 to secure the adjacent sections 26 in the substantially perpendicular position relative to each other. The snap button 72 may engage the second orifice 70 to secure the adjacent sections 26 in the longitudinally aligned position relative to each other. Alternatively, the linking arm 64 may be rotatably secured to an end cap 32 that is secured to one of a pair of adjacent sections 26 and the first orifice 68 and second orifice 70 may be defined by an end cap 32 that is secured to the other of the other of the pair of adjacent sections 26. The latching mechanism 62 may be utilized between all adjacent sections 26 of the plurality of extruded sections 26 that comprise the tailgate 22.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a bed having first and second side panels;
   a tailgate rotatably secured to the bed along a horizontal axis and having a plurality of extruded sections that are arranged in a longitudinally extending chain, each section extending laterally between the first and second side panels and adjacent sections of the plurality of extruded sections being secured to each other via hinges that rotate about axes that are substantially parallel to the horizontal axis, wherein the adjacent sections are configured to rotate about the hinges between longitudinally aligned positions to substantially perpendicular positions relative to each other; and
   a first set of latching mechanisms configured to secure adjacent sections in the longitudinally aligned positions.

2. The vehicle of claim 1 further comprising end caps secured to lateral ends of the extruded sections, wherein each of the first set of latching mechanisms includes a spring loaded snap button that is secured to one of a pair of adjacent sections and is configured to engage an orifice defined by the end cap that is secured to the other of the pair of adjacent sections in order to secure the pair of adjacent sections in the longitudinally aligned position.

3. The vehicle of claim 1 further comprising a second set of latching mechanisms configured to secure adjacent sections in the substantially perpendicular positions relative to each other.

4. The vehicle of claim 3, wherein each of the second set of latching mechanisms includes a slidable latching pin that is secured to one of a pair of adjacent sections and is configured to engage an orifice defined by the other of the pair of adjacent sections to secure the pair of adjacent sections in the substantially perpendicular position.

5. The vehicle of claim 3, wherein each of the second set of latching mechanisms includes a linking arm that is rotatably secured to one of a pair of adjacent sections and is configured to engage an orifice defined by the other of the pair of adjacent sections to secure the pair of adjacent sections in the substantially perpendicular position.

6. The vehicle of claim 5, wherein each of the linking arms includes snap button that is configured to engage the orifice that is defined by the other of the pair of adjacent sections.

7. The vehicle of claim 1 further comprising a pair of end caps secured to opposing lateral ends of a bottom section of the plurality of extruded sections, wherein the end caps include pins that rotatably secure the tailgate to the bed.

8. A vehicle comprising:
   a bed having first and second side panels extending upward from a floor panel;
   a tailgate rotatably secured to the bed proximate the floor panel and having a plurality of sections arranged in a chain that extends from the floor panel to tops of the side panels when the tailgate is in an upward position, wherein adjacent sections of the plurality of sections are secured to each other via hinges that rotate about horizontal axes, and wherein the adjacent sections are configured to rotate about the hinges between longitudinally aligned positions to substantially perpendicular positions relative to each other; and
   a first set of latching mechanisms configured to secure the adjacent sections in the longitudinally aligned positions.

9. The vehicle of claim 8 further comprising end caps secured to lateral ends of the sections, wherein each of the first set of latching mechanisms includes a spring loaded snap button that is secured to one of a pair of adjacent sections and is configured to engage an orifice defined by the end cap that is secured to the other of the pair of adjacent sections in order to secure the pair of adjacent sections in the longitudinally aligned position.

10. The vehicle of claim 8 further comprising a second set of latching mechanisms configured to secure adjacent sections in the substantially perpendicular positions relative to each other.

11. The vehicle of claim 10, wherein each of the second set of latching mechanisms includes a slidable latching pin that is secured to one of a pair of adjacent sections and is configured to engage an orifice defined by the other of the pair of adjacent sections to secure the pair of adjacent sections in the substantially perpendicular position.

12. The vehicle of claim 10, wherein each of the second set of latching mechanisms includes a linking arm that is rotatably secured to one of a pair of adjacent sections and is configured to engage an orifice defined by the other of the pair of adjacent sections to secure the pair of adjacent sections in the substantially perpendicular position.

13. The vehicle of claim 12, wherein each of the linking arms includes snap button that is configured to engage the orifice that is defined by the other of the pair of adjacent sections.

14. The vehicle of claim 8 further comprising a pair of end caps secured to opposing lateral ends of a bottom section of the plurality of sections, wherein the end caps include pins that rotatably secure the tailgate to the bed.

15. A truck comprising:
    a tailgate including, a plurality of laterally extending extruded sections arranged in a longitudinally extending chain, hinges rotatably securing adjacent sections of the plurality of laterally extending extruded sections to each other along laterally extending axes, wherein the adjacent sections are configured to rotate about the hinges between longitudinally aligned positions to substantially perpendicular positions relative to each other; and a first set of latching mechanisms configured to secure adjacent sections in the longitudinally aligned positions.

16. The truck of claim 15 further comprising end caps secured to lateral ends of the extruded sections, wherein each of the first set of latching mechanisms includes a spring loaded snap button that is secured to one of a pair of adjacent sections and is configured to engage an orifice that is defined by the end cap secured to the other of the pair of adjacent sections in order to secure the pair of adjacent sections in the longitudinally aligned position.

17. The truck of claim 15 further comprising a second set of latching mechanisms configured to secure adjacent sections in the substantially perpendicular positions relative to each other.

18. The truck of claim 17, wherein each of the second set of latching mechanisms includes a slidable latching pin that is secured to one of a pair of adjacent sections and is configured to engage an orifice defined by the other of the pair of adjacent sections to secure the pair of adjacent sections in the substantially perpendicular position.

19. The truck of claim 17, wherein each of the second set of latching mechanisms includes a linking arm that is rotatably secured to one of a pair of adjacent sections and is configured to engage an orifice defined by the other of the pair of adjacent sections to secure the pair of adjacent sections in the substantially perpendicular position.

20. The vehicle of claim 19, wherein each of the linking arms includes snap button that is configured to engage the orifice that is defined by the other of the pair of adjacent sections.

* * * * *